United States Patent [10] Patent No.: US 10,834,084 B2
Ouellette et al. (45) Date of Patent: Nov. 10, 2020

(54) PRIVILEGED IDENTITY AUTHENTICATION BASED ON USER BEHAVIORS (71) Applicant: International Business Machines Corporation, Armonk, NY (US)

(72) Inventors: Matthew P. Ouellette, Fredericton (CA); Christopher J. Hockings, Burleigh Waters (AU); Suhas V. Kashyap, Pasir Ris Grove (SG); Chee Meng Low, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 237 days.

(21) Appl. No.: 16/041,305

(22) Filed: Jul. 20, 2018

(65) Prior Publication Data
US 2020/0028850 A1 Jan. 23, 2020

(51) Int. Cl.
H04L 29/06 (2006.01)
(52) U.S. Cl.
CPC ............. H04L 63/10 (2013.01); H04L 63/08 (2013.01); H04L 63/1433 (2013.01)
(58) Field of Classification Search
None
See application file for complete search history.

(56) References Cited

U.S. PATENT DOCUMENTS

| 8,776,168 | B1 | 7/2014 | Gibson et al. |
| 8,782,782 | B1 | 7/2014 | Dicovitsky et al. |
| 9,838,383 | B1* | 12/2017 | Perlmuter ............ H04L 63/083 |
| 2008/0288330 | A1 | 11/2008 | Hildebrand et al. |
| 2015/0121518 | A1 | 4/2015 | Shmueli et al. |
| 2016/0094577 | A1 | 3/2016 | Shih et al. |
| 2017/0230417 | A1* | 8/2017 | Amar ..................... H04L 63/20 |
| 2019/0311121 | A1* | 10/2019 | Martin ................. G06F 21/577 |

OTHER PUBLICATIONS

Lambert, Leslie K., "Beyond Risk Scoring," CSO Online, Feb. 13, 2017, 4 pages.
SolvIT Serbia, "CA Threat Analytics for Privileged Access Management," Feb. 14, 2017, 5 pages.
Cyber Ark Software Ltd., "Know the Path of an Attack and Block it with Privileged Account Security," 2016, 10 pages.

* cited by examiner

Primary Examiner — Joseph P Hirl
Assistant Examiner — Hassan Saadoun
(74) Attorney, Agent, or Firm — Troutman Pepper Hamilton Sanders LLP (57) ABSTRACT Embodiments can provide a method for accessing an endpoint, including: receiving, from a privileged user, a request for accessing the endpoint; providing, by a user behavior analytics device, a risk score with respect to the privileged user, wherein the risk score is calculated based on at least one action performed by the privileged user. If the risk score is lower than a first predefined value, providing access to the endpoint for the privileged user. If the risk score is higher than a second predefined value, denying the request for accessing the endpoint. If the risk score is between the first predefined value and the second predefined value, performing at least one of: providing, by a privileged identity management server, a multi-factor authentication against the privileged user; and rerouting the request for accessing the endpoint for approval.

20 Claims, 10 Drawing Sheets

PRIVILEGED IDENTITY AUTHENTICATION BASED ON USER BEHAVIORS

TECHNICAL FIELD

The present application relates generally to a system and a method that can be used to access an endpoint with a privileged identity authentication. The privileged identity authentication is performed in terms of a risk score based on user behaviors.

BACKGROUND

Privileged identity management (PIM) monitors and protects superuser accounts in an organization's IT environment. The superuser accounts typically have access to high value data that needs protection for commercial and/or regulatory reasons. These accounts can be targeted by both third party (malicious entities) seeking to steal data and authorized administrators abusing their privileges, either intentionally or unintentionally. A malicious intent can be described as connecting to a computer with an intent of misusing privileges on that computer for personal gains and expanding the control over the entire network. When a malicious process steals data from a privileged system, it is known as a privilege escalation attack.

Figure 1:
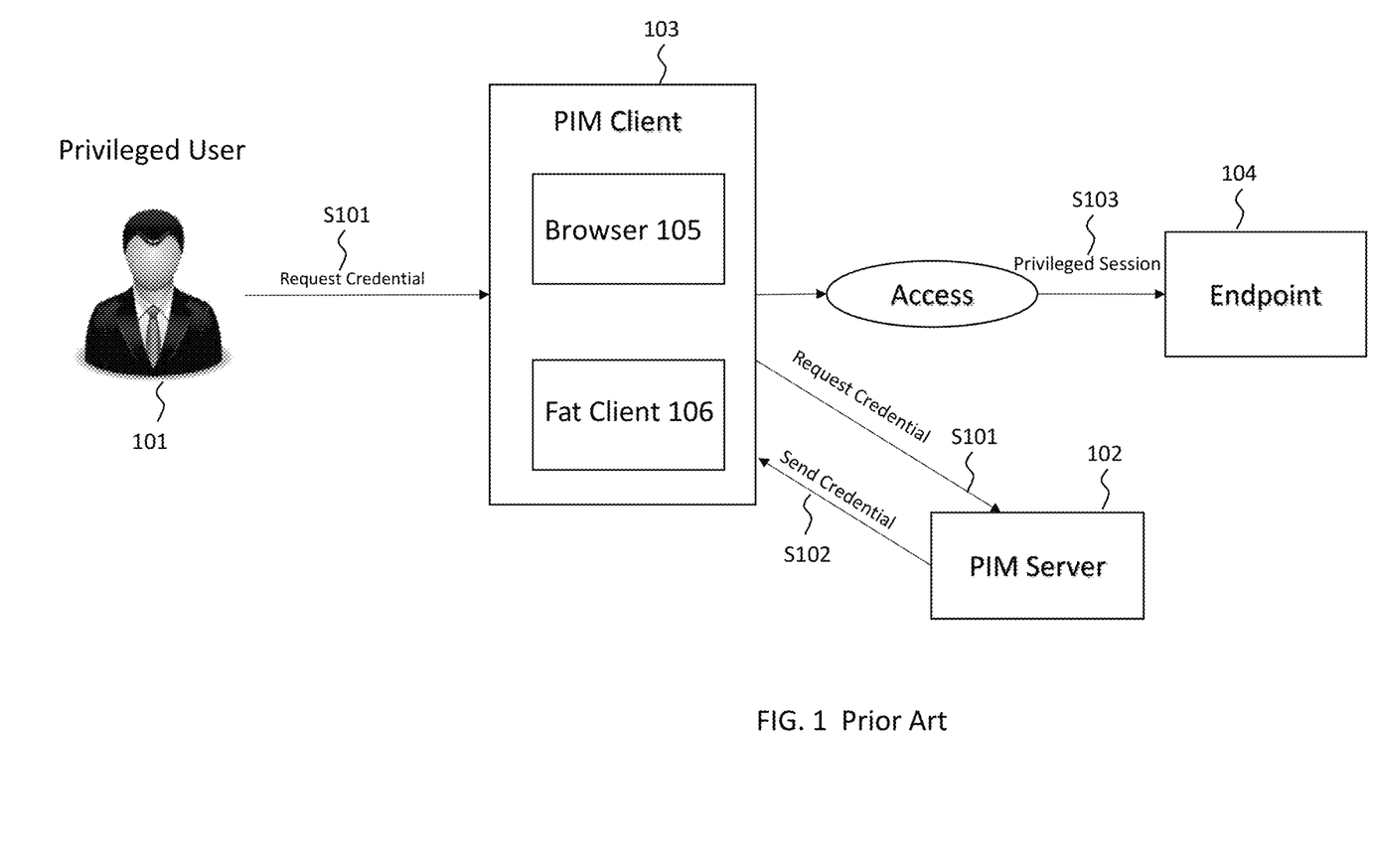
FIG. 1 is a block diagram illustrating a conventional process of accessing an endpoint.

FIG. 1 is a block diagram illustrating a conventional process of accessing an endpoint. As shown in FIG. 1, privileged user 101 requests a shared credential from the PIM server 102 through PIM client 103 (step S101). Upon receiving the credential (step S102) from the PIM server 102, a privileged session is established between the PIM client 103 and endpoint 104 (step S103), and the privileged user 101 can access the endpoint 104 through the PIM client 103. The endpoint 104 can be a Linux host acting as an application server, a database server, a ERP System, or a backend mainframe server, etc. The PIM client 103 can be browser 105 or fat client 106 (also called thick client).

In the current process, no risk score is calculated based on continuous learning of user behaviors. Further, no risk score is calculated based on user's prior actions on the endpoint 104, either. Thus, an access to the endpoint 104 may get allowed even if the privileged user 101 performs anomalous actions, which leads to more privilege escalation attacks.

SUMMARY

Embodiments can provide a method for accessing an endpoint, comprising: receiving, from a privileged user, a request for accessing the endpoint; providing, by a user behavior analytics device, a risk score with respect to the privileged user, wherein the risk score is calculated based on at least one action performed by the privileged user. If the risk score is lower than a first predefined value, providing access to the endpoint for the privileged user; if the risk score is higher than a second predefined value, denying the request for accessing the endpoint; if the risk score is between the first predefined value and the second predefined value, performing at least one of: providing, by a privileged identity management server, a multi-factor authentication against the privileged user; and rerouting the request for accessing the endpoint for approval.

Embodiments can further provide a method, wherein the at least one action includes at least one of: accessing the endpoint from an unusual location; accessing the endpoint at unusual time; accessing the endpoint for the first time; at least one login failure; more than one request within a predefined time period; at least one action previously performed on the endpoint; at least one action previously performed on a network device; and at least one action previously performed using a non-privileged account.

Embodiments can further provide a method further comprising: receiving, from a privileged user, a request for a credential for accessing the endpoint; forwarding, by a privileged identity management client, the request for the credential to the privileged identity management server; sending, by the privileged identity management server, a request for the risk score to the user behavior analytics device.

Embodiments can further provide a method further comprising automatically detecting, by the user behavior analytics device, that the request for the credential is from a privileged account of the privileged user.

Embodiments can further provide a method further comprising informing, by the privileged identity management server, the user behavior analytics device that the request for the credential is from the privileged account of the privileged user.

Embodiments can further provide a method wherein if the risk score is lower than the first predefined value, establishing a privileged session between the privileged identity management client and the endpoint.

Embodiments can further provide a method further comprising continuously updating, by the user behavior analytics device, the risk score based on at least one action performed by the privileged user during the established privileged session; and deciding, by the privileged identity management server, whether the established privileged session is continued or terminated based on the continuously updated risk score.

Embodiments can further provide a method, wherein the privileged identity management client is a browser or a fat client, and the fat client is one of Windows RDP client, Putty on Linux, Database client, and VNC client.

Embodiments can further provide a method, wherein the risk score is calculated further based on at least one action performed on the endpoint by the privileged user during one or more previous privileged sessions.

Embodiments can provide a method of accessing an endpoint, comprising: receiving, from a privileged user, a request for a credential for accessing the endpoint; forwarding, by a privileged identity management client, the request for the credential to the privileged identity management server; sending, by the privileged identity management server, a request for a risk score with respect to the privileged user, to a user behavior analytics device; receiving, from the user behavior analytics device, the risk score, wherein the risk score is calculated based on at least one action performed by the privileged user for an impending privileged session and at least one action performed on the endpoint by the privileged user during one or more previous privileged sessions. If the risk score is lower than a first predefined value, providing the credential, by the privileged identity management server, to the privileged identity management client, and accessing the endpoint by the privileged user through the privileged identity management client. If the risk score is higher than a second predefined value, denying the request for the credential; if the risk score is between the first predefined value and the second predefined value, performing at least one of: providing, by the privileged identity management server, a multi-factor authentication against the privileged user; and rerouting the request for the credential for approval.

Embodiments can further provide a method, wherein the at least one action performed by the privileged user for the impending privileged session includes at least one of: accessing the endpoint from an unusual location; accessing the endpoint at unusual time; accessing the endpoint for the first time; at least one login failure; more than one request within a predefined time period; at least one action previously performed on the endpoint; at least one action previously performed on a network device; and at least one action previously performed using a non-privileged account.

Embodiments can further provide a method further comprising: automatically detecting, by the user behavior analytics device, that the request for the credential is from a privileged account of the privileged user.

Embodiments can further provide a method further comprising: informing, by the privileged identity management server, the user behavior analytics device that the request for the credential is from the privileged account of the privileged user.

Embodiments can further provide a method, wherein if the risk score is lower than the first predefined value, establishing a privileged session between the privileged identity management client and the endpoint.

Embodiments can further provide a method further comprising: continuously updating, by the user behavior analytics device, the risk score based on at least one action performed by the privileged user during the established privileged session; and deciding, by the privileged identity management server, whether the established privileged session is continued or terminated based on the continuously updated risk score.

Embodiments can further provide a system for accessing an endpoint, comprising: a privileged identity management client, configured to receive a request for a credential for accessing the endpoint, from a privileged user; a privileged identity management server, configured to receive the request for the credential forwarded by the privileged identity management client; and a security information and event management system, including a user behavior analytics device, configured to calculate a risk score based on at least one action performed by the privileged user for an impending privileged session and at least one action performed on the endpoint by the privileged user during one or more previous privileged sessions. If the risk score is lower than a first predefined value, the credential is provided from the privileged identity management server to the privileged identity management client, a privileged session is established between the privileged identity management client and the endpoint, and the endpoint is configured to be accessed by the privileged user through the privileged identity management client.

Embodiments can further provide a system, wherein the at least one action performed by the privileged user for the impending privileged session includes at least one of: accessing the endpoint from an unusual location; accessing the endpoint at unusual time; accessing the endpoint for the first time; at least one login failure; more than one request within a predefined time period; at least one action previously performed on the endpoint; at least one action previously performed on a network device; and at least one action previously performed using a non-privileged account.

Embodiments can further provide a system, wherein the user behavior analytics device is configured to automatically detect that the request for the credential is from a privileged account of the privileged user, wherein if the risk score is higher than a second predefined value, the request for the credential is denied by the privileged identity management server. If the risk score is between the first predefined value and the second predefined value, a multi-factor authentication is further provided by the privileged identity management server to the privileged user, or the request for the credential is rerouted to a human administrator for approval.

Embodiments can further provide a system, wherein the privileged identity management server is configured to inform the user behavior analytics device that the request for the credential is from the privileged account of the privileged user.

Embodiments can further provide a system, wherein the endpoint is at least one of: a Linux host acting as an application server, a database server, a ERP system, and a backend mainframe server.

Additional features and advantages of this disclosure will be made apparent from the following detailed description of illustrative embodiments that proceeds with reference to the accompanying drawings.

BRIEF DESCRIPTION OF THE DRAWINGS

The foregoing and other aspects of the present disclosure are best understood from the following detailed description when read in connection with the accompanying drawings. For the purpose of illustrating the disclosure, there is shown in the drawings embodiments that are presently preferred, it being understood, however, that the disclosure is not limited to the specific instrumentalities disclosed. Included in the drawings are the following Figures.

DETAILED DESCRIPTION OF EXEMPLARY EMBODIMENTS

Embodiments of the present disclosure provides a system and a method for accessing an endpoint with a privileged identity authentication. In some embodiments, Security Information and Event Management (SIEM) system is provided to perform user behavior analysis, and a risk score of the privileged user is calculated in view of user behaviors. The SIEM system provides a real-time analysis of security alerts generated by applications and network hardware. A decision whether to allow an access to an endpoint is made in terms of the risk score and configurable policies (i.e., configurable risk thresholds and configurable factors contributing to the risk score). If the risk score is higher than a first predefined value, then the access request is denied. If the risk score is lower than a second predefined value, then the access request is allowed. If the risk score is between the first predefined value and the second predefined value, then the access request can be rerouted to a human manager for approval. Alternatively, the access request can be rerouted to an authentication system for approval. For example, the authentication system can be a machine learning model trained by human managers, the machine learning model itself or other authentication models. In other embodiments, the authentication system can be a multi-factor authentication system, which can further check the identity of the privileged user. For example, SMS OTP (i.e., one-time password is delivered through a short message to a registered mobile phone) or biometric authentication (i.e., a fingerprint, face recognition, etc.) is provided for further identity authentication.

In some embodiments, the risk score is calculated based on continuous learning of user behaviors. The risk score can further be calculated based on a history of the privileged user's actions on an endpoint. The final risk score is used to route the authentication workflow when the privileged user requests to access the endpoint and perform any privileged operations on the endpoint, i.e., the final risk score can be used for near real-time privileged operations. The privileged operations may include copying, modifying or deleting a file on the endpoint; accessing a database on the endpoint and performing database operations, such as "add," "delete," "modify," and the like; executing any programs on the endpoint; editing firewall settings of the endpoint; and upgrading any programs on the endpoint, etc.

With the embodiments of the disclosure, "risky" users who perform anomalous actions or suspicious actions can be prevented from accessing a credential that grants escalated access. Further, a complex authorization workflow may be introduced if the risk score of the user is relatively high. Additionally, risk thresholds and factors contributing to the risk score can be customized by an administrator of a PIM system.

Figure 2:
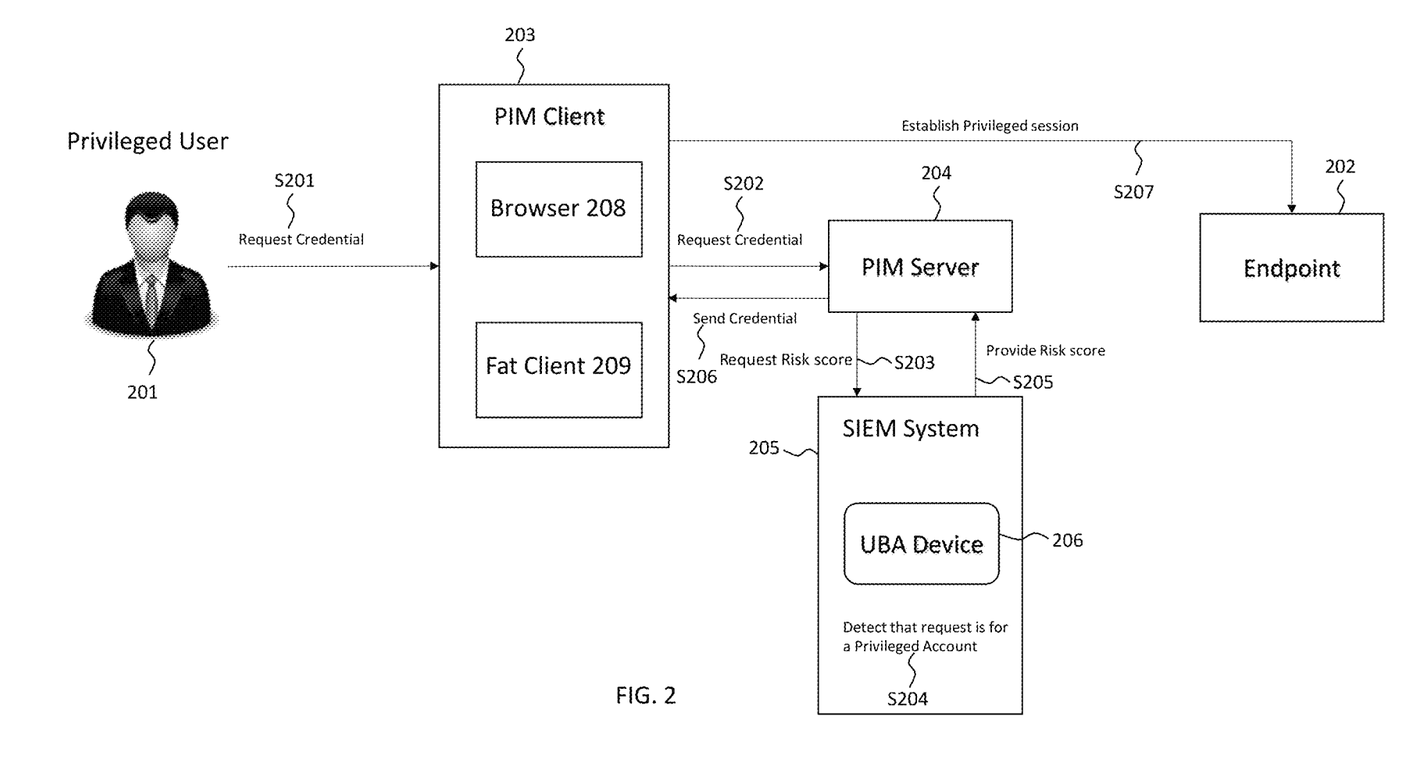
FIG. 2 is a block diagram illustrating a process of accessing an endpoint, according to some embodiments described herein.

FIG. 2 is a block diagram illustrating a process of accessing an endpoint, according to some embodiments described herein. In an embodiment, privileged user 201 can access endpoint 202 through a PIM system. The PIM system includes PIM client 203, PIM server 204 and SIEM system 205. The SIEM system 205 includes UBA (User Behavior Analytics) device 206, used for calculating a risk score based on user behaviors. Any existing algorithm for calculating the risk score can apply to the UBA device 206. The user behaviors are continuously monitored by the UBA device 206, for example IBM QRadar.

In some embodiments, a history of the privileged user 201 actions previously performed on the endpoint 202 (for example, actions performed on the applications which run on the endpoint 202), in addition to user behaviors, is also considered to calculate the risk score. In some embodiments, only a history of the privileged user 201 actions previously performed on the endpoint 202 is used to calculate the risk score. Alternatively, the risk score can be updated based on a recent history of all user actions, for example, all the user actions in the last three accesses to any endpoint. In another embodiment, at the time of requesting access to a particular endpoint 202 through the PIM system, the risk score is updated based on the context in which the request is raised. The context may include access location, access time, access frequency, login failures, etc. The risk score can be updated with respect to any user behavior towards the privileged account. The UBA device 206 can learn the user behaviors including login failure, privilege escalation, account profile change, etc. through Lightweight Directory Access Protocol (LDAP), Active Directory (AD), and Indexed sequential access method (ISAM). In yet another embodiment, the risk score is continually updated based on commands or/and actions taken by the privileged user 201 during the privileged session, which is established through the PIM system.

In yet another embodiment, the risk score can be updated with respect to any user behavior towards the network. Specifically, the UBA device 206 can learn the user behaviors through network devices, for example a router, a network switch, a firewall, a proxy, an IPS (Intrusion Prevention System), etc.

In yet another embodiment, the risk score is continually updated based on an accumulative history of all user actions across various endpoints 202. The user actions may include actions performed by the user with his/her own account (non-privileged account) or/and the actions performed by the same user with the privileged account. For example, if a user (using his/her non-privileged account) just opened a dropbox account, and then the same user proceeds to request a privileged account to access an endpoint that holds personal identifiable information (PII). The UBA device 206 can recognize that the user requesting the privileged account is the user who just opened the dropbox account using his/her non-privileged account. The UBA device 206 can also identify that the action of opening a dropbox account is a "risky" action, because the user may copy the personal identifiable information to the newly opened dropbox account. Accordingly, the UBA device 206 updates the risk score to reflect a heightened risk.

In an embodiment, the UBA device 206 can learn the user behaviors through machine learning techniques. The machine learning model stipulates normal behaviors expected for the privileged user 201. If there is any deviation or anomaly in the user behaviors, the UBA device 206 detects the deviations or anomalies and updates the risk score to reflect a heightened risk.

In some embodiments, the PIM client 203 includes browser 208 or fat client 209 (also called thick client). The browser 208 can be any web browser, such as Chrome, Firefox, Safari, Internet Explorer, or Edge, and the like. The fat client 209 can be Windows RDP client, Putty on Linux, Database client, or VNC client, etc., which is used to remotely access the endpoint 202. The PIM client 203 also includes a code module (called "PIM agent"). In an embodiment, the PIM agent is integrated with the browser 208 or the fat client 209. The PIM agent is used to fetch a credential from the PIM server 204 so that the browser 208 or fat client 209 can utilize the credential to automate login to the endpoint 202. The endpoint 202 can be a Linux host acting as an application server, a database server, a ERP system, or a backend mainframe server, etc.

The privileged user 201 requests a shared credential for accessing the endpoint 202 (step S201) from the PIM agent included in the PIM client 203. The PIM agent then forwards the request to the PIM server 204 (step S202). The PIM server 204 consults UBA device 206 for a risk score through REST API (step S203), and the PIM server 204 also informs the UBA device 206 that the request is from the privileged user 201. The UBA device 206 automatically detects that the incoming request is from the privileged user 201 (step S204) and provides the risk score to the PIM server 204 (step S205). If the risk score is lower than a predefined threshold, then the credential is sent to the PIM agent (step S206), the PIM agent forwards the credential to the browser 208 or fat client 209, and the browser 208 or fat client 209 sets up a connection to the endpoint 202 (step S207). Accordingly, a privileged session is established between the PIM client 203 and the endpoint 202, and the privileged user 201 can perform any privileged operations on the endpoint 202.

Figure 3:
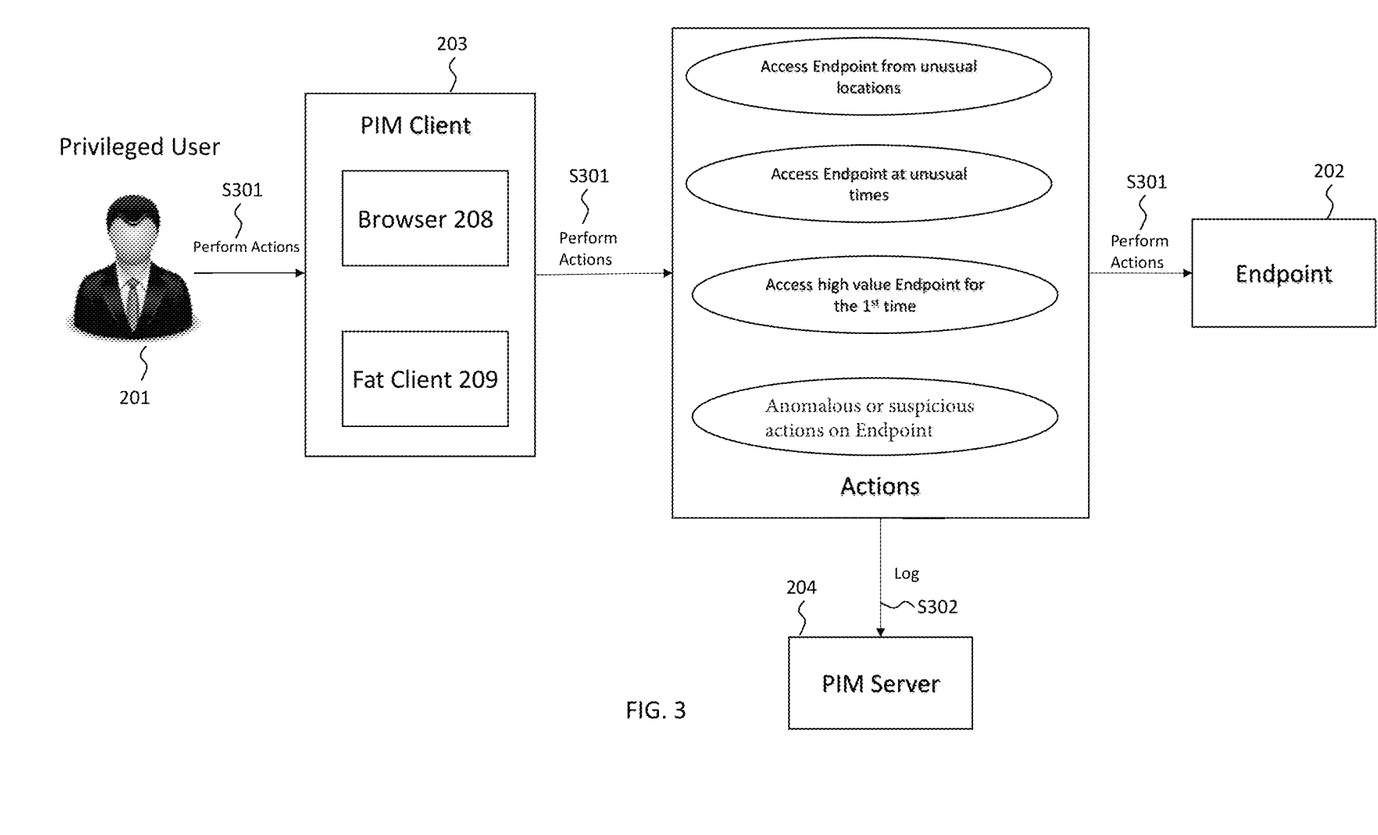
FIG. 3 is a block diagram illustrating anomalous actions performed by a privileged user, according to some embodiments described herein.

With respect to FIGS. 3-9, for brevity, the same steps and the same modules as those of FIG. 2 would be labeled with the same reference numbers, and repetitive descriptions about the same steps may be omitted. FIG. 3 is a block diagram illustrating anomalous actions performed by a privileged user, according to some embodiments described herein. As shown in FIG. 3, in an embodiment, the privileged user 201 performs one or more anomalous actions on the endpoint 202 through the PIM client 203 (step S301). The anomalous actions can include requesting a shared credential to access the endpoint 202 from an unusual location, requesting a shared credential to access the endpoint 202 at unusual time, requesting a shared credential to access the endpoint 202 (especially a high value endpoint) for the first time, and anomalous activities on the endpoint 202. The anomalous activities on the endpoint 202 can be performed through internet bots, web bugs, spywares, ransomwares, etc., by the privileged user 201. These anomalous actions performed by the privileged user 201 are logged into the PIM server 204 (step S302).

Figure 4:
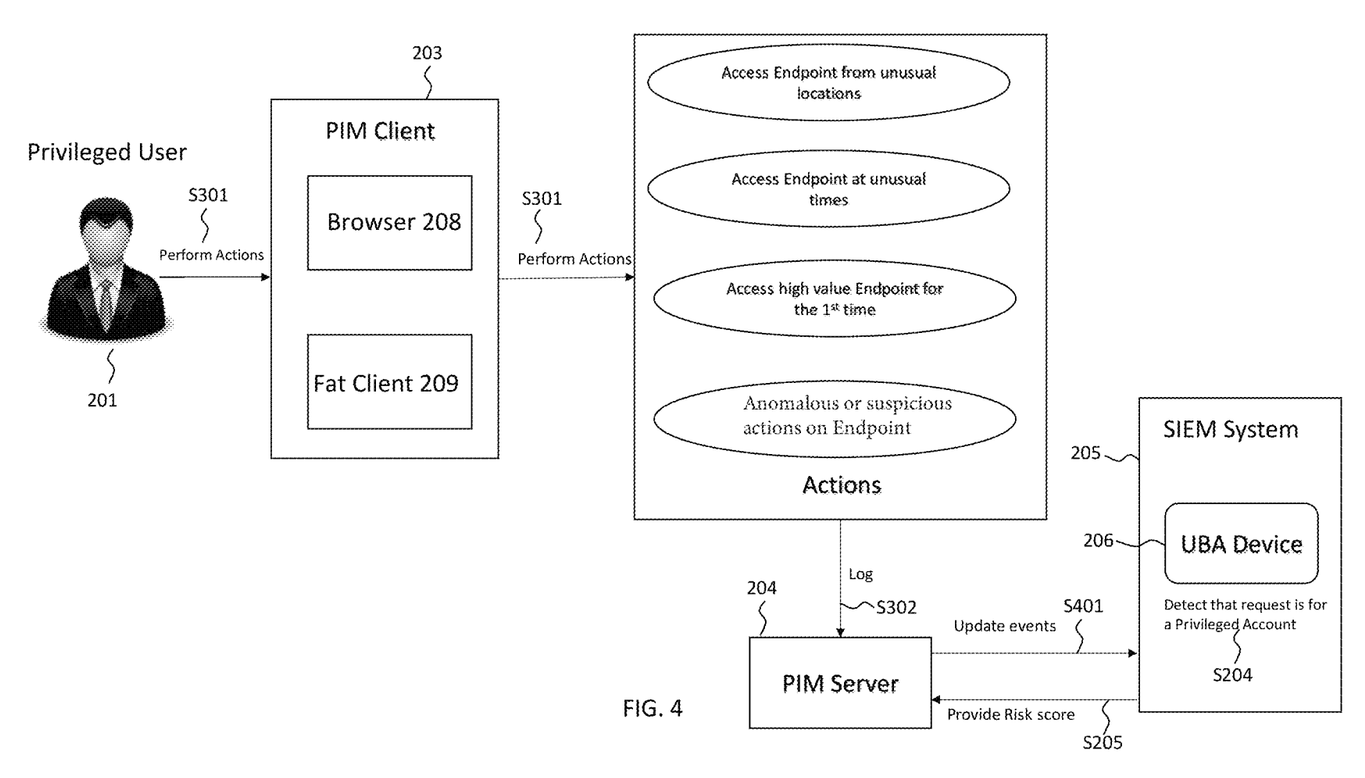
FIG. 4 is a block diagram illustrating a process of updating a risk score based on anomalous actions performed by a privileged user, according to some embodiments described herein.

FIG. 4 is a block diagram illustrating a process of updating a risk score based on anomalous actions performed by a privileged user, according to some embodiments described herein. The UBA device 206 already has a risk score calculated based on previous actions performed by the privileged user. If the privileged user 201 requests a shared credential for accessing the endpoint 202 from the PIM client 203 again, the UBA device 206 will update the risk score based on logged events from the PIM server 204. As shown in FIG. 4, the UBA device 206 obtains logged events from the PIM server 204, i.e., anomalous actions or legitimate actions performed by the privileged user 201 (step S401). The UBA device 206 detects that a request for the shared credential is from the privileged user 201 (step S204) and updates the risk score of the privileged user 201. The UBA device 206 provides the updated risk score to the PIM server 204 in near real time (step S205). The PIM server 204 then decides whether a privileged session can be established depending on the updated risk score.

Figure 5:
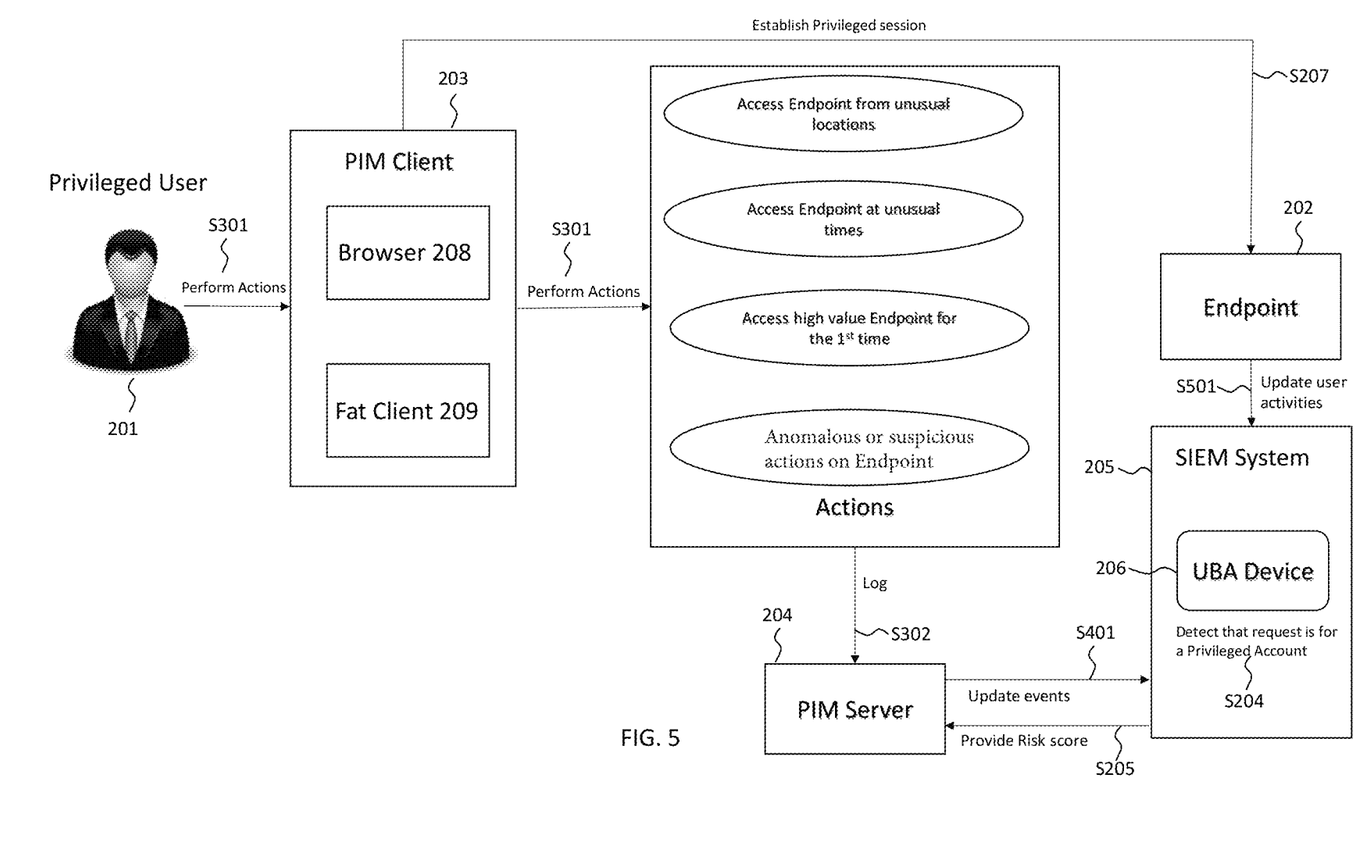
FIG. 5 is a block diagram illustrating a process of updating a risk score based on anomalous actions performed by a privileged user, according to other embodiments described herein.

FIG. 5 is a block diagram illustrating a process of updating a risk score based on anomalous actions performed by a privileged user, according to other embodiments described herein. In an embodiment, if the updated risk score is lower than a predefined risk threshold, for example, the updated risk score <10, then a privileged session is established between the PIM client 203 and the endpoint 202 (step S207) after the PIM server 204 sends the shared credential to the PIM client 203. In this embodiment, the UBA device 206 also collects logged events of user activities on the endpoint 202 (step S501), in addition to the logged events from the PIM server 204. The risk score is updated based on both the logged events from the endpoint 202 and the logged events from the PIM server 204. If the updated risk score is higher than a predefined threshold, for example, the updated risk score >15, then the privileged session may be terminated. The UBA device 206 continuously updates the risk score based on both the logged events from the endpoint 202 and the logged events from the PIM server 204, and the PIM server 204 decides whether the privileged session would be continued or terminated in terms of the updated risk score.

Figure 6:
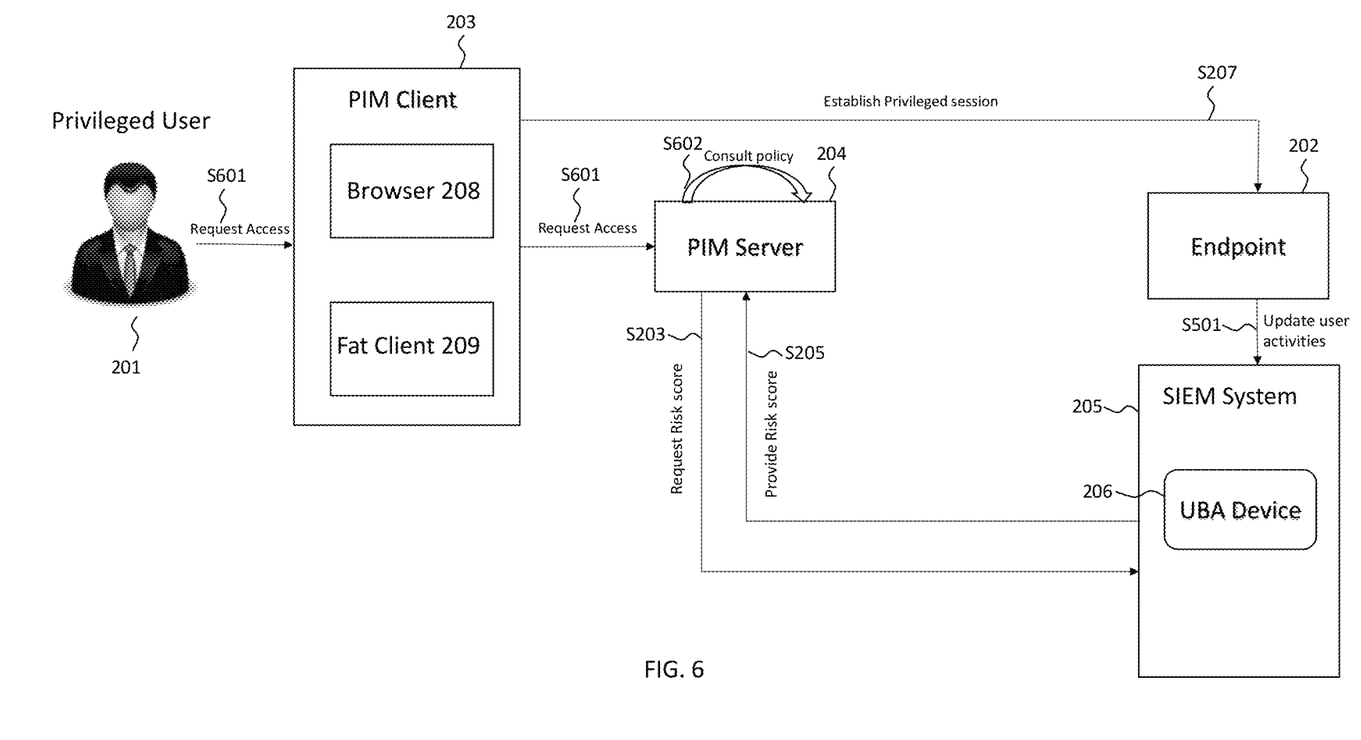
FIG. 6 is a block diagram illustrating a process of accessing an endpoint by a privileged user with a low risk score, according to some embodiments described herein.

FIG. 6 is a block diagram illustrating a process of accessing an endpoint by a privileged user with a low risk score, according to some embodiments described herein. As shown in FIG. 6, the privileged user 201 requests to access the endpoint 202 (step S601), i.e., the privileged user 201 requests a shared credential for accessing the endpoint 202 from the PIM client 203. The PIM server 204 requests a risk score from the UBA device 206 (step S203). In an embodiment, the PIM server 204 informs the UBA device 206 that the access request is from the privileged user 201. In another embodiment, the PIM server 204 would not inform the UBA device 206 of the access request from the privileged user 201. The UBA device 206 calculates a risk score. In an embodiment, the risk score is calculated based on user behaviors, i.e., actions performed by the privileged user 201. The user behavior information is logged and provided by the PIM server 204. The UBA device 206 provides the risk score to the PIM server 204 (step S205). The PIM server 204 consults policies with respect to the risk score (step S602).

In an embodiment, the PIM server 204 can be configured to have the following policies: 1. If the risk score <10, a privileged session is established between the PIM client 203 and the endpoint 202; 2. If the risk score ≥10 and ≤15, the authentication workflow is deflected to a human manager for approval. In an embodiment, the human manager would be provided with actions of the privileged user 201 that lead to an increase in the risk score. In another embodiment, a multi-factor authentication, for example, SMS OTP, biometric authentication, etc., can be provided to further check the identity of the privileged user 201. In some embodiments, both the approval from the human manager and the multi-factor authentication are required; 3. If the risk score >15, the access request is directly denied. In an embodiment, the human manager would be informed of the denial. For example, an email can be sent to the human manager. The predefined risk thresholds 10 and 15 can be modified by the administrator of the PIM system.

In an embodiment, the following factors may contribute to the risk score separately or in various combinations: 1. A high volume of access requests from the same privileged user 201; 2. Multiple login failures on PIM client 203; 3. An access request at unusual time; 4. First time access request from the privileged user 201; 5. Login from a different geographic location; 6. Suspicious commands executed by the privileged user 201 on the endpoint 202, for example, Sudo related commands; Iptables; rm-rf on sensitive directories, and the like.

As shown in FIG. 6, the risk score <10, the PIM server 204 sends a shared credential to the PIM client 203, and thus a privileged session is established between the PIM client 203 and the endpoint 202 (step S207). The UBA device 206 continuously collects logged events of user activities on the endpoint 202 (step S501), and the risk score is updated accordingly. The privileged session can be continued or terminated based on the updated risk score. In an embodiment, the UBA device 206 may also consider a history of the privileged user's actions on the endpoint 202 for the risk score calculation. For example, the UBA device 206 can check the legitimacy of the actions performed by the privileged user 201 during one or more of the previous privileged accesses.

Figure 7:
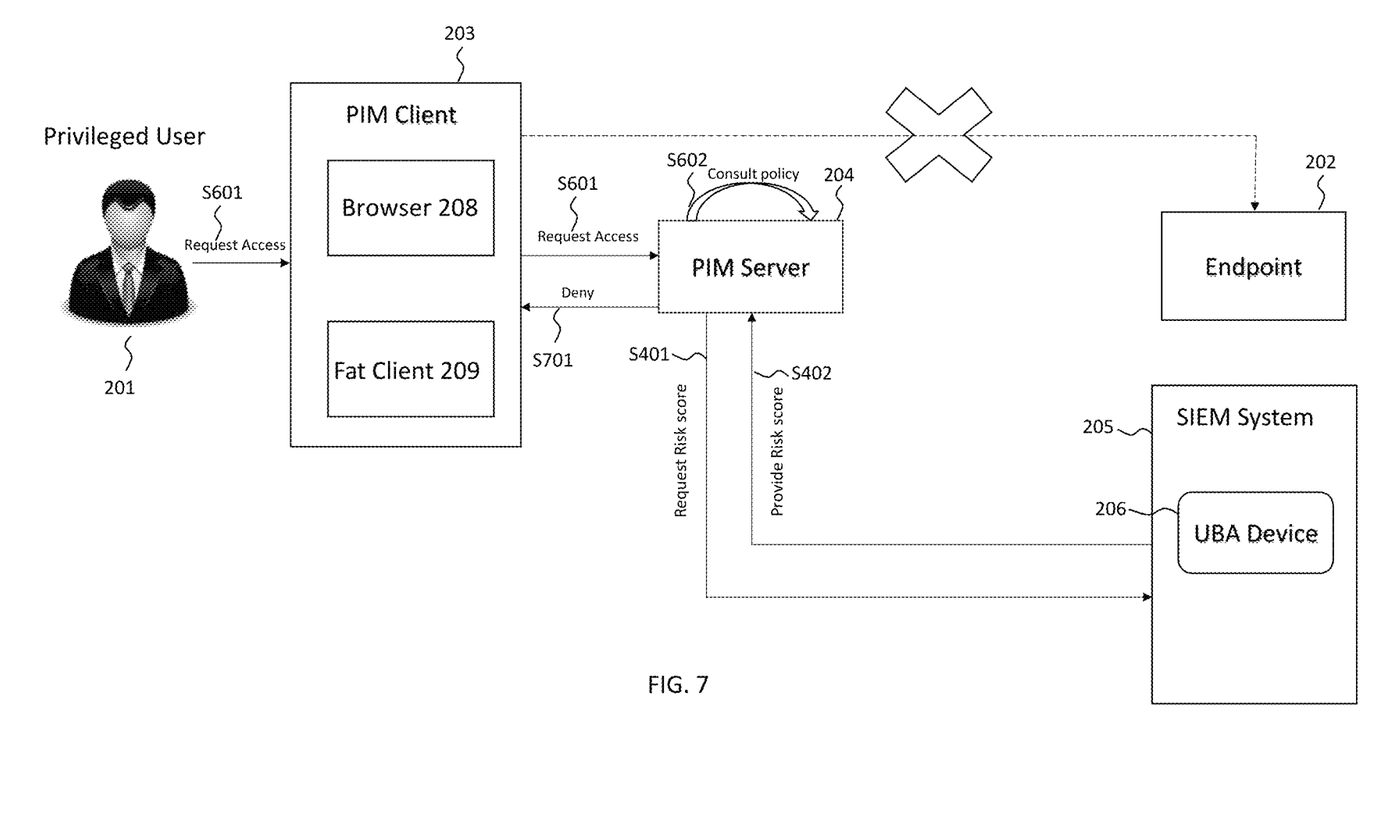
FIG. 7 is a block diagram illustrating a process of accessing an endpoint by a privileged user with a high risk score, according to some embodiments described herein.

FIG. 7 is a block diagram illustrating a process of accessing an endpoint by a privileged user with a high risk score, according to some embodiments described herein. As shown in FIG. 7, if the risk score >15, the access request is directly denied (step S701). In the situation of a denial of the access request, no access is provided to endpoint 202. In an embodiment, an email can be sent to the human manager or the PIM administrator to notify of the access denial.

Figure 8:
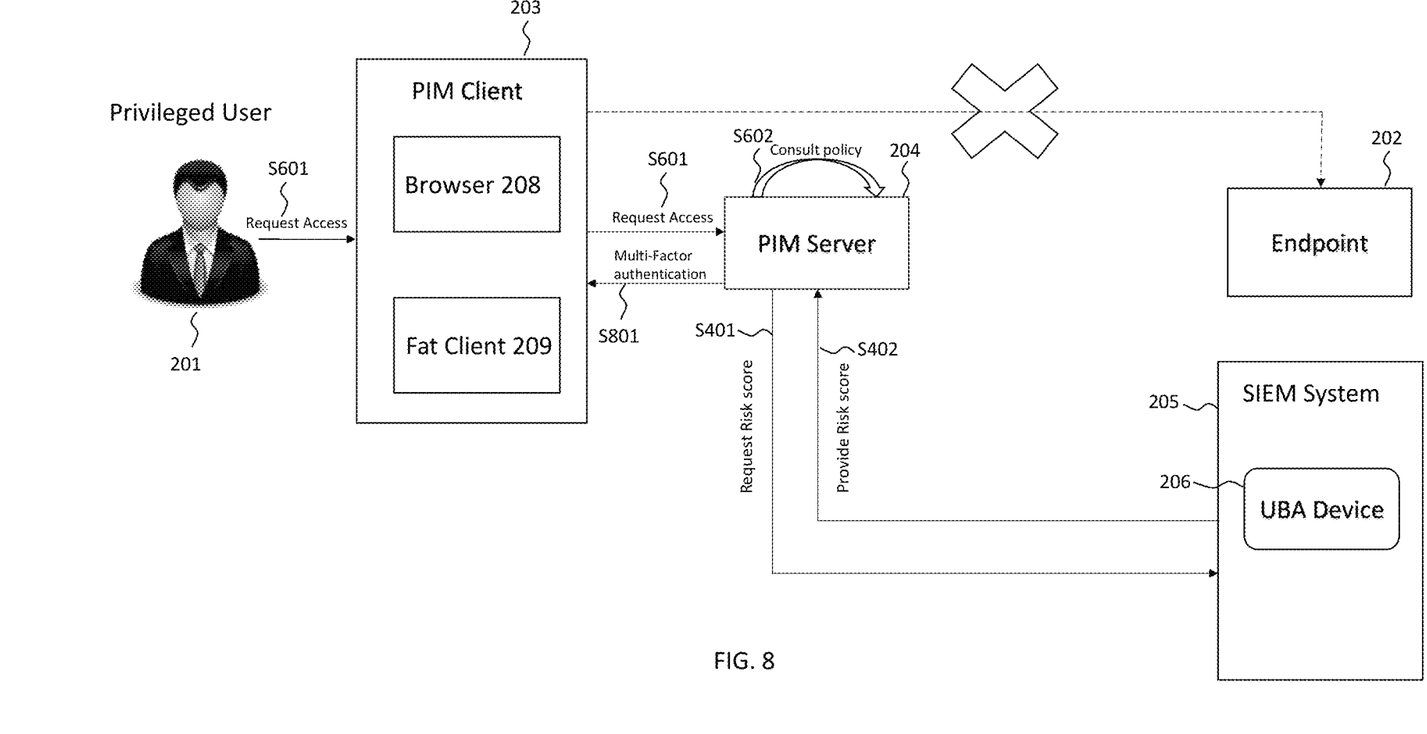
FIG. 8 is a block diagram illustrating a process of accessing an endpoint by a privileged user with a high risk score, according to other embodiments described herein.

FIG. 8 is a block diagram illustrating a process of accessing an endpoint by a privileged user with a high risk score, according to other embodiments described herein. As shown in FIG. 8, if the risk score ≥10 and ≤15, a multi-factor authentication, for example, SMS OTP, biometric authentication, etc., can be provided to further check the identity of the privileged user 201 (step S801).

Figure 9:
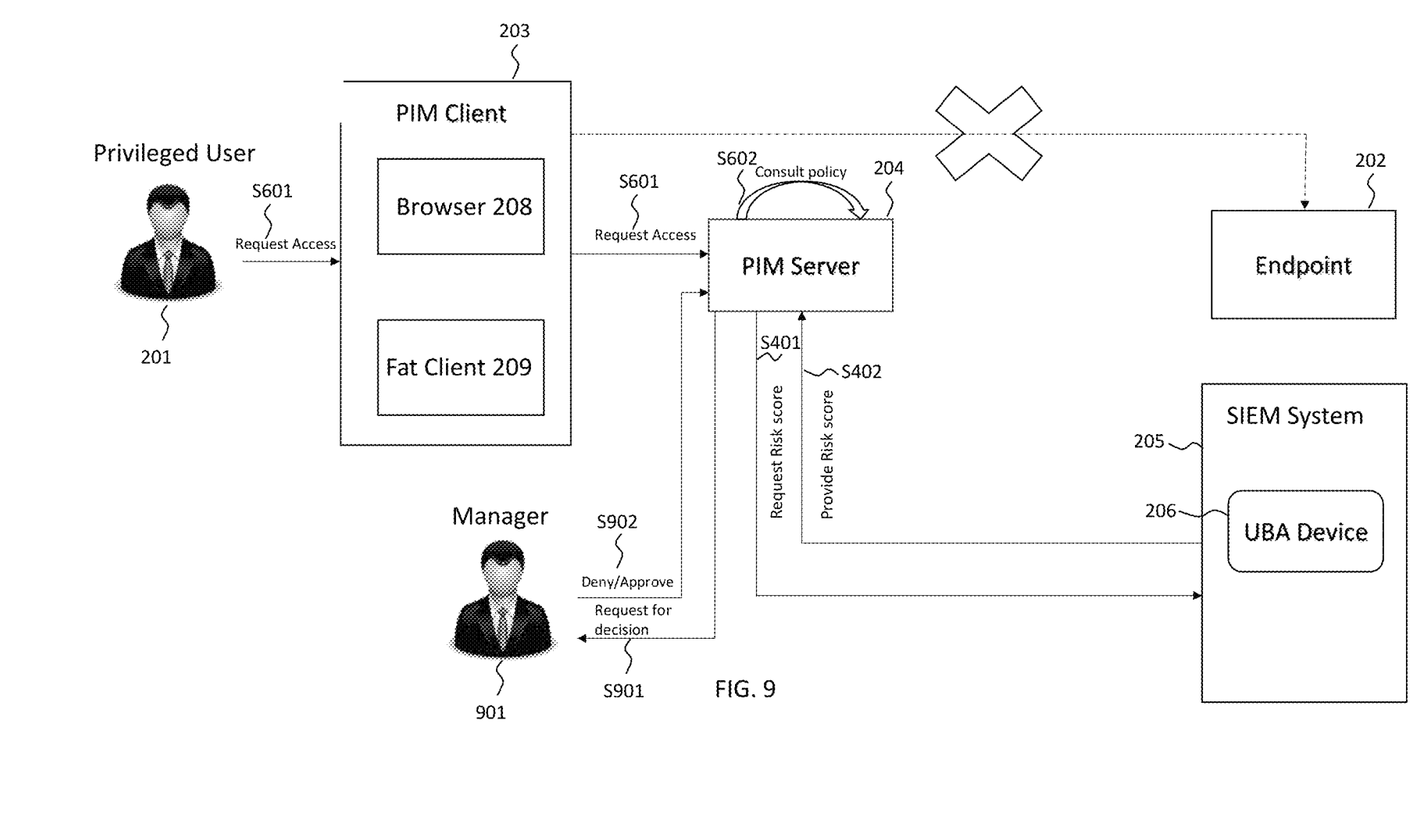
FIG. 9 is a block diagram illustrating a process of accessing an endpoint by a privileged user with a high risk score, according to another embodiment described herein.

FIG. 9 is a block diagram illustrating a process of accessing an endpoint by a privileged user with a high risk score, according to another embodiment described herein. As shown in FIG. 9, if the risk score ≥10 and ≤15, the authentication workflow is deflected to human manager 901 for decision (step S901). In an embodiment, the human manager 901 would be provided with logged events of the privileged user 201 that lead to an increase in the risk score. The human manager 901 either denies or approves the access request from the privileged user (step S902). In some embodiments, the authentication workflow can be deflected to an authentication system which can automatically make a decision (i.e., denial or approval). For example, the authentication system can be a machine learning model, which was trained by human managers, the machine learning model itself or other authentication models. For another example, the authentication system can be a multi-factor authentication system, which can further check the identity of the privileged user.

In an embodiment, the UBA device 206 also calculates a risk score for the impending session, in addition to the risk score of the privileged user 201. The risk score for the impending session can be calculated based on logged events during the last privileged session. For example, if the privileged user 201 performed anomalous activities on the endpoint 202 after the last privileged session was established, then a risk score for the impending session can be calculated based on the logged anomalous actions. The PIM server 204 may decide the impending session is a risky session based on the two risk scores (i.e., the risk score of the privileged user 201 and the risk score of the impending session).

Figure 10:
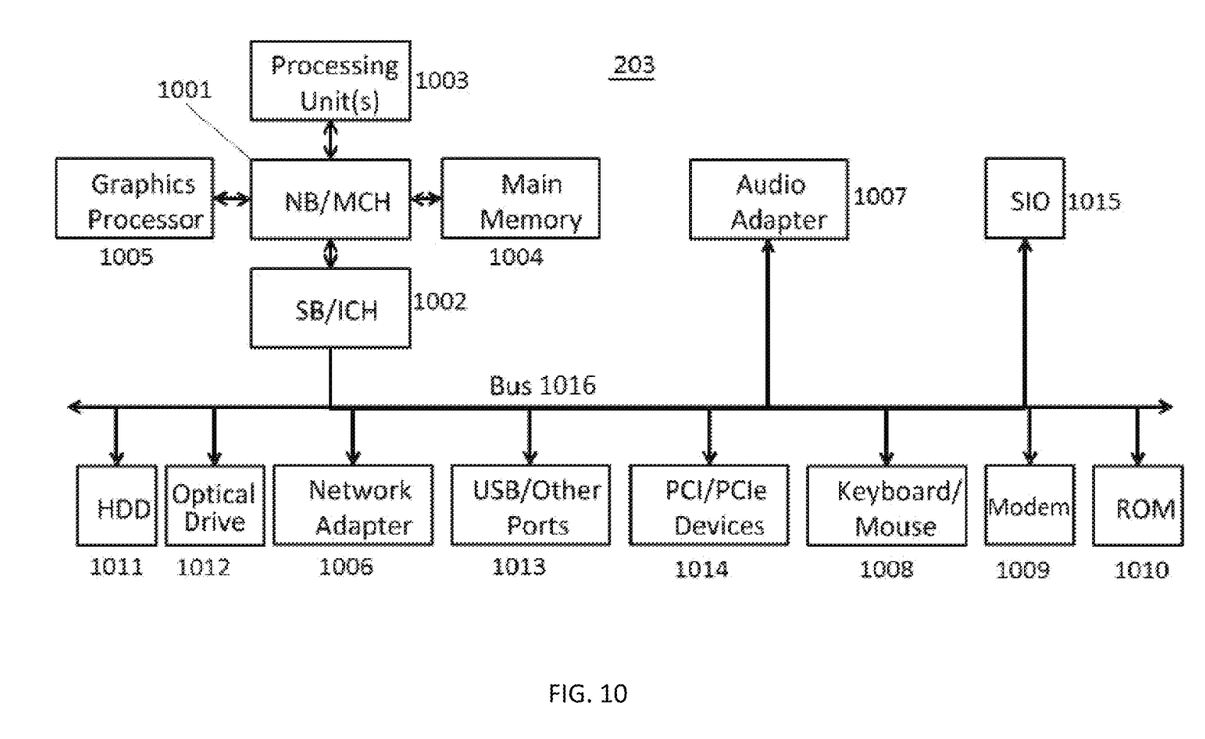
FIG. 10 is a block diagram of an example PIM client with which aspects of the illustrative embodiments may be implemented.

FIG. 10 is a block diagram of an example PIM client 203 with which aspects of the illustrative embodiments may be implemented. In the depicted example, PIM client 203 employs a hub architecture including a north bridge and memory controller hub (NB/MCH) 1001 and south bridge and input/output (I/O) controller hub (SB/ICH) 1002. Processing unit 1003, main memory 1004, and graphics processor 1005 are connected to the NB/MCH 1001. Graphics processor 1005 is connected to the NB/MCH 1001 through an accelerated graphics port (AGP) (not shown in FIG. 10).

In the depicted example, the network adapter 1006 is connected to the SB/ICH 1002. The audio adapter 1007, keyboard and mouse adapter 1008, modem 1009, read only memory (ROM) 1010, hard disk drive (HDD) 1011, optical drive (CD or DVD) 1012, universal serial bus (USB) ports and other communication ports 1013, and the PCI/PCIe devices 1014 are connected to the SB/ICH 1002 through bus system 1016. PCI/PCIe devices 1014 include Ethernet adapters, add-in cards, and PC cards for notebook computers. ROM 1010 may be, for example, a flash basic input/output system (BIOS). The HDD 1011 and optical drive 1012 use an integrated drive electronics (IDE) or serial advanced technology attachment (SATA) interface. The super I/O (SIO) device 1015 is connected to the SB/ICH 1002.

An operating system may run on processing unit 1003. The operating system may coordinate and provide control of various components within the PIM client 203. An object-oriented programming system, such as the Java™ programming system, may run in conjunction with the operating system and provide calls to the operating system from the object-oriented programs or applications executing on the PIM client 203. As a server, the PIM client 203 may be an IBM® eServer™ System P® running the Advanced Interactive Executive operating system or the Linux operating system. The PIM client 203 may be a symmetric multiprocessor (SMP) system that may include a plurality of processors in the processing unit 1003. Alternatively, a single processor system may be employed.

Instructions for the operating system, the object-oriented programming system, and applications or programs are located on storage devices, such as the HDD 1011, and are loaded into the main memory 1004 for execution by the processing unit 1003. The processes for embodiments of the bookmarking system may be performed by the processing unit 1003 using computer usable program code, which may be located in a memory such as, for example, main memory 1004, ROM 1010, or in one or more peripheral devices.

A bus system 1016 may be comprised of one or more busses. The bus system 1016 may be implemented using any type of communication fabric or architecture that may provide for a transfer of data between different components or devices attached to the fabric or architecture. A communication unit such as the modem 1009 or network adapter 1006 may include one or more devices that may be used to transmit and receive data.

Those of ordinary skill in the art will appreciate that the hardware depicted in FIG. 10 may vary depending on the implementation. Other internal hardware or peripheral devices, such as flash memory, equivalent non-volatile memory, or optical disk drives may be used in addition to or in place of the hardware depicted. Moreover, the PIM client 203 may take the form of any of a number of different data processing systems, including but not limited to, client computing devices, server computing devices, tablet computers, laptop computers, telephone or other communication devices, personal digital assistants, and the like. Essentially, PIM client 203 may be any known or later developed data processing system without architectural limitation. In an embodiment, the PIM server 204 (not shown in FIG. 10) may have the same structure as that of the PIM client 203 or a different structure from that of the PIM client 203.

Embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a head disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN) and/or a wireless network. The network may include copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which includes one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The system and processes of the figures are not exclusive. Other systems, processes and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers and processes can be implemented using hardware components, software components, and/or combinations thereof. No claim element herein is to be construed under the provisions of 35 U.S.C. 112 (f), unless the element is expressly recited using the phrase "means for."

Although the disclosure has been described with reference to exemplary embodiments, it is not limited thereto. Those skilled in the art will appreciate that numerous changes and modifications may be made to the preferred embodiments of the disclosure and that such changes and modifications may be made without departing from the true spirit of the disclosure. It is therefore intended that the appended claims be construed to cover all such equivalent variations as fall within the true spirit and scope of the disclosure.

The present description and claims may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within in the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the example provided herein without departing from the spirit and scope of the present disclosure.

What is claimed is:

1. A method for accessing an endpoint, comprising:
receiving, from a privileged user, a request for accessing the endpoint;
providing, by a user behavior analytics device, a risk score with respect to the privileged user, wherein the risk score is calculated based on at least one action performed by the privileged user;
updating, by a user behavior analytics device, the risk score in real time based on at least one new action performed by the privileged user;
if the risk score is between the first predefined value and the second predefined value,
rerouting the request for accessing the endpoint to a machine learning model trained by humans for approval.

2. The method as recited in claim 1, wherein the at least one action includes at least one of:
accessing the endpoint from an unusual location;
accessing the endpoint at unusual time;
accessing the endpoint for the first time;
at least one login failure;
more than one request within a predefined time period;
at least one action previously performed on the endpoint;
at least one action previously performed on a network device; and
at least one action previously performed using a non-privileged account.

3. The method as recited in claim 1, further comprising:
receiving, from a privileged user, a request for a credential for accessing the endpoint;
forwarding, by a privileged identity management client, the request for the credential to the privileged identity management server;
sending, by the privileged identity management server, a request for the risk score to the user behavior analytics device.

4. The method as recited in claim 3, further comprising:
automatically detecting, by the user behavior analytics device, that the request for the credential is from a privileged account of the privileged user.

5. The method as recited in claim 4, further comprising:
informing, by the privileged identity management server, the user behavior analytics device that the request for the credential is from the privileged account of the privileged user.

6. The method as recited in claim 3, wherein if the risk score is lower than the first predefined value, establishing a privileged session between the privileged identity management client and the endpoint.

7. The method as recited in claim 6, further comprising:
continuously updating, by the user behavior analytics device, the risk score based on at least one action performed by the privileged user during the established privileged session; and
deciding, by the privileged identity management server, whether the established privileged session is continued or terminated based on the continuously updated risk score.

8. The method as recited in claim 3, wherein the privileged identity management client is a browser or a fat client, and the fat client is one of a Windows Remote Desktop Protocol (RDP) client, a Putty on Linux, a Database client, and a Virtual Network Computing (V.N.C.) client.

9. The method as recited in claim 3, wherein the risk score is calculated further based on at least one action performed on the endpoint by the privileged user during one or more previous privileged sessions.

10. A method of accessing an endpoint, comprising:
receiving, from a privileged user, a request for a credential for accessing the endpoint; forwarding, by a privileged identity management client, the request for the credential to the privileged identity management server;
sending, by the privileged identity management server, a request for a risk score with respect to the privileged user, to a user behavior analytics device;
receiving, from the user behavior analytics device, the risk score, wherein the risk score is calculated based on at least one action performed by the privileged user for an impending privileged session and at least one action performed on the endpoint by the privileged user during one or more previous privileged sessions;
if the risk score is lower than a first predefined value, providing the credential, by the privileged identity management server, to the privileged identity management client, and accessing the endpoint by the privileged user through the privileged identity management client.

11. The method as recited in claim 10, wherein the at least one action performed by the privileged user for the impending privileged session includes at least one of:
accessing the endpoint from an unusual location;
accessing the endpoint at unusual time;
accessing the endpoint for the first time;
at least one login failure;
more than one request within a predefined time period;
at least one action previously performed on the endpoint;
at least one action previously performed on a network device; and
at least one action previously performed using a non-privileged account.

12. The method as recited in claim 10, further comprising:
automatically detecting, by the user behavior analytics device, that the request for the credential is from a privileged account of the privileged user.

13. The method as recited in claim 12, further comprising:
informing, by the privileged identity management server, the user behavior analytics device that the request for the credential is from the privileged account of the privileged user.

14. The method as recited in claim 11, wherein if the risk score is lower than the first predefined value, establishing a privileged session between the privileged identity management client and the endpoint.

15. The method as recited in claim 14, further comprising:
continuously updating, by the user behavior analytics device, the risk score based on at least one action performed by the privileged user during the established privileged session; and
deciding, by the privileged identity management server, whether the established privileged session is continued or terminated based on the continuously updated risk score.

16. A system for accessing an endpoint, comprising:
a privileged identity management client, configured to receive a request for a credential for accessing the endpoint, from a privileged user;
a privileged identity management server, configured to receive the request for the credential forwarded by the privileged identity management client; and
a security information and event management system, including a user behavior analytics device, configured to calculate a risk score based on at least one action performed by the privileged user for an impending privileged session and at least one action performed on the endpoint by the privileged user during one or more previous privileged sessions;
wherein if the risk score is lower than a first predefined value, the credential is provided from the privileged identity management server to the privileged identity management client, a privileged session is established between the privileged identity management client and the endpoint, and the endpoint is configured to be accessed by the privileged user through the privileged identity management client.

17. The system as recited in claim 16, wherein the at least one action performed by the privileged user for the impending privileged session includes at least one of:
accessing the endpoint from an unusual location;
accessing the endpoint at unusual time;
accessing the endpoint for the first time;
at least one login failure;
more than one request within a predefined time period;
at least one action previously performed on the endpoint;
at least one action previously performed on a network device; and
at least one action previously performed using a non-privileged account.

18. The system as recited in claim 16, wherein the user behavior analytics device is configured to automatically detect that the request for the credential is from a privileged account of the privileged user,
wherein if the risk score is higher than a second predefined value, the request for the credential is denied by the privileged identity management server;
if the risk score is between the first predefined value and the second predefined value,
a multi-factor authentication is further provided by the privileged identity management server to the privileged user, or
the request for the credential is rerouted to a human administrator for approval.

19. The system as recited in claim 18, wherein the privileged identity management server is configured to inform the user behavior analytics device that the request for the credential is from the privileged account of the privileged user.

20. The system as recited in claim 16, wherein the endpoint is at least one of: a Linux host acting as an application server, a database server, a ERP system, and a backend mainframe server.

* * * * *